United States Patent Office

3,003,913
Patented Oct. 10, 1961

3,003,913
COPPER COMPOSITIONS AND METHOD FOR MAKING THE SAME
Percy J. Rowe, 521 Pearson, Ferndale, Mich.
No Drawing. Filed Jan. 19, 1959, Ser. No. 787,330
9 Claims. (Cl. 167—16)

The present invention relates to a method for manufacturing new copper compositions from metallic copper, and more particularly relates to an improved continuous process for manufacturing copper compositions from metallic copper by employing aqueous ammoniacal solutions in the presence of oxygen, and to the resulting improved copper compositions.

In my prior Patents 2,536,096 and 2,536,097, I disclosed and claimed the products of and a method for continuous production of certain copper compounds comprising the steps of contacting metallic copper with an aqueous ammoniacal solution containing ammonium sulfate, agitating the solution sufficiently to continuously dislodge from the surface of the metallic copper the film which is formed thereon by the contact between the solution and the metallic copper, and thereafter separating the dislodged film from the reacting solution. While the present invention relates generally to the same type of reaction, it more specifically represents an improvement in the respects that it enables the production of a range of copper compositions at a comparable rate of yield to that of U.S. Patent 2,536,097 by employing a lesser quantity of agitation, or produces a substantial increase in yield by employing a comparable degree of agitation to that employed in the process of U.S. Patent 2,536,097. Moreover, the resulting compounds have advantageous characteristics of extremely fine and uniform particle size which make them especially adapted for direct use as the toxic ingredient in agricultural fungicides and insecticides by the mere combination of the fine particulate product of this invention with a suitable carrier, for example, water.

The present invention is based on the discovery that the degree of adherence of the film which forms on the surface of metallic copper as a result of contacting that metallic copper with an aqueous ammoniacal solution containing ammonium sulfate is decreased appreciably by incorporating in that solution certain proportions of ammonium chloride. The resulting film has a sufficiently lesser degree of adherence to the surface of the metallic copper that it can be much more easily dislodged in a continuous process and the resulting particle size of the dislodged film is controllable over a wider range of particle size than is obtained from the contact of the metallic copper with an ammoniacal solution containing only ammonium sulfate.

The primary object of the present invention is to provide a process of forming a range of useful copper compositions from metallic copper which employs a minimum number of steps and continuously produces copper materials of extremely fine and uniform particle size in a simple, efficient and inexpensive manner.

Another object of this invention is to provide a process for forming copper composition from metallic copper by the use of aqueous ammoniacal solutions which enables the attainment of higher yields of copper products by employing a comparable degree of agitation to that used in heretofore known processes, and enables the attainment of comparable yields of copper products to that of heretofore known processes by employing substantially lesser quantities of agitation than has been necessary heretofore.

A further and important object of this invention is to provide a new and improved copper composition comprising copper hydroxide, copper sulfate, copper chloride and containing a small quantity of ammonia.

A still further object of this invention is to provide a copper composition containing copper hydroxide, copper sulfate, copper chloride and ammonia which is satisfactory for direct addition to pure water to provide an agricultural insecticide and fungicide having a pH value within the range of about 6 to about 8.

Generally stated, the process of this invention comprises contacting finely divided metallic copper in the form, for example, of scrap copper wire, or copper strap with an aqueous solution of ammonium hydroxide, ammonium sulfate and ammonium chloride and agitating this solution, in the presence of oxygen, sufficiently to dislodge the copper film which is formed upon the surface of the metallic copper and thereafter separating the dislodged film from the reacting solution, and by conventional steps washing and drying the material to a powder final product form.

The strength of the ammoniacal solution which is satisfactory for the purposes of this invention is not particularly critical and can satisfactorily vary from an ammonium hydroxide concentration as low as about 1% up to a concentration that is normally characterized as aqua ammonia; however, solutions containing about 20 to about 100 grams per liter of ammonium hydroxide represent the preferred operating strength. The upper concentration is actually limited only by the fact that at concentrations of ammonium hydroxide above about 100 grams per liter the loss of ammonia by volatilization increases and the cost of operation of the process similarly increases but it is apparent that in certain operations it may be desirable to employ the higher proportions of ammonium hydroxide for the attainment of other objectives, such as faster rate of reaction, improved attack of impure starting materials, etc. As the concentration of ammonium hydroxide decreases below about 10 g./l. the rate of reaction decreases and ultimately becomes too slow to be practicable.

It has been found that the concentration of each of the ammonium sulfate and ammonium chloride and the relative proportions of each which are present in the operating solution is critical to the degree of adherence of the film on the surface of the copper and to the successful continuous operation of the process.

The compositions which are formed by the process of this invention are generally designated copper oxy-chloride-sulfate compositions and contain chloride, sulfate and bound ammonia in certain limited proportions, and these proportions have an important effect on the ease of dislodging the continuously forming film on the copper surface during reaction, the resulting uniformity of particle size and the optimum utility of these compositions. More particularly, it has been found that the composition should contain, in weight percent, about 0.6% to about 1.1% ammonia, expressed as $NH_3$, about 1.9% to about 12.6% chloride and about 1.0% to about 5.0% sulfur, balance copper oxide and copper hydroxide, but small proportions of water or other innocuous materials may be present. A preferred composition contains about 0.6%–1.1% ammonia, about 1.9% to about 9.5% chloride and about 1.0% to about 3.5% sulfur, balance copper oxide and copper hydroxide. When the product contains less than the above given minimum of chloride, the composition will normally contain an undesirably high concentration of ammonia and the water solutions of it will have a pH above about 8.0, and the dislodging of the product film greatly increases. The presence of ammonia in the product improves the uniformity of particle size and offsets the acidifying tendencies of the chloride and sulfate components to give a substantially neutral product, i.e., one having a pH in the range of about 6–8 in pure water. The sulfate component, expressed in terms of sulfur, is important because it functions in the operating solution in conjunction with the chloride to greatly improve the yield. The increased ease of dislodging the copper composition which forms as a film on the surface of the metallic copper results in forming a product having extremely fine particle size and improved uniformity of the particle size. The compositions of this invention contain particles varying from about 0.1 micron to about 15 microns in diameter but the preponderating mass of the particles are 1 micron and less in diameter. This uniformity in particle size makes the suspension or solution of the composition relatively easy, and although the addition of water does not form a true solution the resulting aqueous admixture can be readily sprayed as an agricultural fungicide or insecticide when formulated in strengths which are now conventional for other similarly toxic copper compounds.

In order to produce compositions containing the above given proportions of chloride, sulfur and ammonia in admixture with copper oxide and copper hydroxide by contacting metallic copper with an aqueous ammonium hydroxide solution it has been found that the solution should also contain a minimum concentration of about 4 grams per liter of ammonium chloride and a minimum of about 12–15 g./l. of ammonium sulfate. The solutions may contain relatively large proportions of ammonium chloride and ammonium sulfate but the proportions should be related to the ammonium hydroxide concentration so that the concentration of ammonium hydroxide does not exceed about twice that of the sum of the ammonium chloride and ammonium sulfate concentrations. When the above minimums are observed, the compositions of this invention are obtained when the ratio of ammonium chloride to ammonium sulfate is in the range of about 0.1 to about 1.6. The best yields and easiest continuous operation is achieved when both the ammonium chloride and ammonium sulfate are substantially above their minimums; e.g., 40–45 g./l., and are present in a ratio of about 1 to 1. In general, however, the optimum concentrations of ammonium chloride and ammonium sulfate will vary somewhat from installation to installation and will partially depend on the agitation equipment or method employed, the temperature used, the form of the starting material, etc. In most cases the minimum quantity of ammonium chloride which is necessary to give loose films under moderate agitation conditions will represent the most economical condition of operation.

It has also been found that while the compositions of this invention are formed at solution temperatures between ordinary room temperature and about 140° F., better operation is attained at temperatures between about 80° F. and about 120° F. Below about 80° F., the reaction is slow and requires increased relative proportions of ammonium chloride so that it is more expensive than operating in the preferred range of about 90° F.–110° F. Good results are obtained at temperatures below about 80° F. with solutions containing at least about 20 g./l. ammonium chloride and 15 g./l. ammonium sulfate. At temperatures between about 80° F. and 90° F. a minimum of about 8 g./l. ammonium chloride and 15 g./l. ammonium sulfate is satisfactory, whereas above about 90° F. the ammonium chloride concentration can be reduced to its minimum of about 4 g./l. It is to be understood, however, that the above given minimums represent preferred operation limits for continuous commercial production and that the compositions of this invention can be obtained within the earlier given broader limits in longer periods of reaction time by using more violent agitation conditions. The lower temperatures produce the finest particles and are therefore preferred.

As above stated, the presence of ammonium chloride in the solution increases the ease of separating the product film from the metallic copper so that under agitation conditions comparable to those employed in solutions containing no ammonium chloride the product yield is increased. The ultimate yield, however, is a function of the degree of agitation and increasing yields are obtained as the agitation becomes more violent. In the process of this invention satisfactory yields are obtained by using moderate agitation, such as, for example, that obtained by bubbling air through the reaction solution. With the same solution even larger yields are obtained by pressure pumping the solution over the raw material copper, or by tumbling the copper through the solution as is obtained by carrying out the reaction in a rotating cylindrical drum as described in my prior U.S. Patent 2,536,097.

The following examples are given to illustrate more specifically the process as above generally described, but it is to be clearly understood that the proportions of ingredients which are employed, the conditions specified and the results obtained are intended to be exemplary only rather than limitative, and that the hereinabove stated limits of ingredients are the definitive limits of this invention.

*Example 1*

A series of 1 liter solutions were prepared containing 34.8 g./l. ammonium hydroxide, 44.8 g./l. ammonium sulfate, and 44.2 g./l. ammonium chloride. These solutions were placed in a plurality of 2 liter beakers, each containing ½ pound of scrap copper wire. Each of the solutions was agitated by bubbling air through the solution at a fairly steady rate from the end of a small glass tube located within the solution so that the mass of the reacting solution was moderately agitated. The solutions were maintained in contact with the scrap copper at a series of temperatures increasing in increments of about 10° variation including 70° F.–80° F., 80° F.–90° F., 90° F.–100° F., 100° F.–110° F., 110° F.–120° F., and the last solution was operated at 120° F.–125° F. Each of these solutions was agitated for about one hour and a half and at the end of this time an insoluble film began to form on the surface of the copper wire. Agitation was further continued for one and one half hours and the particulate product which formed was separated by filtering, washed with water and dried at low temperature and thereafter weighed to measure the yield of product. The yield and analysis of the product obtained in each case are set forth in tabular form below:

| Solution Analysis | | | Temperature | Product Analysis | | | | | Yield, Grams |
|---|---|---|---|---|---|---|---|---|---|
| Ammonium Chloride | Ammonium Sulfate | Ammonium Hydroxide | | Copper | Chloride | Sulfur | Ammonia | pH | |
| 44.2 | 44.8 | 34.8 | 70–80 | 54.5 | 6.7 | 2.6 | 0.8 | 7.9 | 22.0 |
| 44.2 | 44.8 | 34.8 | 80–90 | 54.2 | 10.8 | 1.0 | 1.0 | 7.8 | 28.0 |
| 44.2 | 44.8 | 34.8 | 90–100 | 54.8 | 9.0 | 1.3 | 0.9 | 7.7 | 29.0 |
| 44.2 | 44.8 | 34.8 | 100–110 | 52.6 | 9.5 | 1.3 | 1.1 | 7.8 | 27.0 |
| 44.2 | 44.8 | 34.8 | 110–120 | 55.4 | 12.6 | 1.4 | 0.8 | 7.8 | 24.0 |
| 44.2 | 44.8 | 34.8 | 120–125 | 52.2 | 7.8 | 2.6 | 0.7 | 7.4 | 25.0 |

The product resulting from operation of the solution at 70° F.–80° F. was more blue in color than the other products, which were blue-green, and the predominating particle size was smaller than 1 micron whereas the other products contained increasing proportions of particles larger than 1 micron as the temperature increased.

When the product was admixed with water in the proportion of 0.04 pound per gallon the resulting admixture was found to be effective as a spray or dusting powder for preventing the growth of fungi on peach trees, apples, potato plants, etc.

*Example II*

An aqueous solution was prepared containing 63.6 g./l. of ammonium hydroxide, 22.1 g./l. of ammonium sulfate and 2.2 g./l. of ammonium chloride. This solution was positioned in a 2 liter beaker fitted with a similar air agitation device described above in Example I and maintained at a temperature of 90° F.–105° F. The solution was agitated in contact with ½ pound of copper scrap for three hours and the product collected, washed, dried and inspected. It was found that only about one tenth the yield of that obtained with the solutions of Example I was obtained and the product analyzed as follows: 57.1% copper, 1.0% sulfur, 0.2% ammonia and contained only traces of chloride. An aqueous admixture of the product gave a pH of 7.9. This product contains a substantially larger proportion of copper hydroxide component in relation to the sulfate and chloride components than found in the preferred products such as produced under conditions as described in Example I, and illustrates the relationship between ultimate product composition and the proportion of ammonium hydroxide relative to the sum of the ammonium chloride, ammonium sulfate in the reacting solution. It will be noted that the ammonium hydroxide is three times the sum of the ammonium chloride and ammonium sulfate and the product which is obtained does not contain the desired quantity of chloride which is necessary to give the desired very fine particle size product in good yield.

*Example III*

This example is intended to illustrate the necessity for the presence of ammonium chloride.

An aqueous solution was prepared to contain 36.4 grams/liter of ammoninum hydroxide and 56.0 grams/liter of ammonium sulfate. This solution was positioned in a 2 liter beaker outfitted with the air agitation tube, described above in Example I, and operated with a comparable rate of flow of air through that tube to that used in Example I and with the solution at a temperature in the range of 90° F. to 100° F., ½ pound of copper scrap wire was thus contacted with the solution for three hours. The separated copper particulate product was collected, washed, dried and it was found that the yield was less than half of that obtained from the solutions of Example I. Upon analysis the product was found to contain 49.0% copper, 6.4% ammonia, 6.4% sulfur and to contain no chloride. An aqueous admixture of the product with water gave a pH of 9.4. It was also noted that the product was powder blue in color.

*Example IV*

This example is intended to illustrate the effect of the absence of ammonium sulfate.

A one liter aqueous solution was prepared containing 75 g./l. of ammonium hydroxide and 29.5 g./l. of ammonium chlorde. A second 1 liter solution was prepared containing 69.0 g./l. of ammonium hydroxide and 59.0 g./l. of ammonium chloride. Each of these solutions was positioned in a 2 liter beaker outfitted with the air agitation tube described above in Example I. The solutions were maintained at a temperature of 80° F.–90° F. and were agitated moderately while contacting ½ pound of scrap copper wire in each beaker for sixteen hours and the particulate product was separated from the reacting solution by filtration. In the case of the solution containing 29.5 g./l. of ammonium chloride the yield was barely sufficient to enable a chemical analysis and in the case of the solution containing 59.0 g./l. of ammonium chloride 10 grams of product was produced after sixteen hours of reaction time. An analysis of the product from the solution containing 29.5 grams/liter of ammonium chloride showed that the product contained 62.1% copper, 0.5% ammonia and no chloride and no sulfur. An analysis of the product obtained from the reacting solution containing 59.0 g./l. of ammonium chloride showed the product to contain 56.9% copper, 12.5% chloride, no sulfur and 0.7% ammonia.

*Example V*

This example is intended to illustrate the effect of low temperature on solutions containing small quantities of ammonium chloride.

A 1 liter solution was prepared containing 31.4 g./l. of ammonium hydroxide, 56.0 g./l. of ammonium sulfate and 8.8 g./l. of ammonium chloride. The solution was positioned in a 2 liter beaker containing ½ pound of scrap copper wire and maintained at a temperature of 70° F.–80° F. After three hours reaction time the product was separated, washed, dried and analyzed, and found to contain 47.1% copper, 0.5% chloride, 5.9% sulfur and 3.9% ammonia. An aqueous admixture of this product with water gave a pH of 9.4.

A second 1 liter portion of the same solution was positioned in a separate 2 liter beaker containing ½ pound of scrap copper wire and maintained at a temperature of 80° F.–90° F. for three hours under similar conditions of air-bubble agitation. At the end of this time the product was separated, washed, dried and analyzed, and found to contain 50.0% copper, 1.9% chloride, 3.5% sulfur, 0.8% ammonia, and a water admixture of the material was found to have a pH of 7.8.

The further effect of increasing the temperature by using the same solution was illustrated by three additional solutions, the first operated at a temperature of 90° F.–100° F., the second operated at a temperature of 100° F.–110° F., and the third operated at a temperature of 110° F.–120° F. In each case the resulting product was a blue-green extremely finely divided particle size material. The product from the 90° F.–100° F. solution was analyzed and found to contain copper 49.7%, chloride 1.9%, sulfur 3.2%, ammonia 0.7%, pH of aqueous admixture 7.4. The product from the solution operated at 100° F.–110° F. contained 49.7% copper, 2.4% chloride, 3.3% sulfur, 0.8% amomnia, and an aqueous admixture had a pH of 7.8. The product from the solution operated at 110° F.–120° F. contained 49.3% copper, 4.5% chloride, 3.1% sulfur, and 0.8% ammonia. An aqueous admixture had a pH of 7.8.

*Example VI*

This example is intended to illustrate the usefulness of temperatures between 70° and 80° F. with solutions containing above about 20 g./l. of ammonium chloride.

An aqueous solution was prepared to contain 38.8 g./l. ammonium hydroxide, 44.8 g./l. ammonium sulfate and 23.6 g./l. ammonium chloride. The solution was positioned in a 2 liter beaker containing ½ pound of copper scrap and maintained at a temperature of 70° F.–80° F. for a period of three hours while agitated moderately with the air agitation specified above in Example I. The product was separated, washed, dried and analyzed, and found to contain 52.8% copper, 5.3% chloride, 2.5% sulfur and 1.0% ammonia.

*Example VII*

This example is intended to illustrate the increase in yield which is obtainable by increasing the degree of agitation of the bath during reaction.

A 1 liter solution was prepared containing 39.6 g./l.

of ammonium hydroxide, 44.2 g./l. of ammonium chloride and 44.8 g./l. of ammonium sulfate. The solution was maintained at a temperature of about 80° F. and agitated with a power-driven stirring rod at approximately 500 r.p.m. which stirred the solution relatively vigorously over the ½ pound of scrap copper wire positioned therein. After approximately one and one half hours the solution was saturated with cupric ion and an insoluble film began to form on the surface of the copper. Agitation was further continued for three one-half-hour periods and at the end of each period the product form was removed, washed, dried and weighed. At the end of the first one-half-hour period 17 grams of finely divided blue-green product was produced. At the end of the second one-half-hour period 14 grams of product was obtained. At the end of the third one-half-hour period 12 grams of the product was obtained and thus producing a total of 43 grams of product from a mass of copper and with the solution corresponding substantially to that of Example I and differing only in that the degree of agitation was substantially higher than was used in Example I.

An analysis of the product showed it to contain 54.7% copper, 8.9% chloride, 1.0% sulfur, and 0.7% ammonia.

*Example VIII*

A series of one liter solutions were prepared containing 31.4 grams/liter ammonium hydroxide, 56 grams/liter ammonium sulfate and 8.8 grams/liter ammonium chloride. These solutions were placed in a plurality of 2 liter beakers, each containing one-half pound of scrap copper wire. Each of the solutions was agitated by the air bubbling procedure described in Example I and maintained in contact with the solution for about three hours at a series of temperatures including 80° F.–90° F., 90° F.–100° F., 100° F.–110° F., and 110° F.–120° F. The product was separated by filtering, washed with water, dried and weighed to measure the yield of the product. There was very little variation in the yield resulting from the use of the various temperatures and the quantity of the yield was approximately one-half that obtained from the use of the preferred proportions of ammonium chloride and ammonium sulfate represented in Example I. The analysis of the product obtained in each case is set forth in the table below.

| Solution Analysis | | | Temp. | Product Analysis | | | | |
|---|---|---|---|---|---|---|---|---|
| Ammonium Chloride | Ammonium Sulfate | Ammonium Hydroxide | | Copper | Chloride | Sulfur | Ammonia | pH |
| 8.8 | 56.0 | 31.4 | 80–90 | 50.0 | 1.9 | 3.5 | 0.8 | 7.8 |
| 8.8 | 56.0 | 31.4 | 90–100 | 49.7 | 1.9 | 3.2 | 0.7 | 7.4 |
| 8.8 | 56.0 | 31.4 | 100–110 | 49.7 | 2.4 | 3.3 | 0.8 | 7.8 |
| 8.8 | 56.0 | 31.4 | 110–120 | 49.3 | 4.5 | 3.1 | 0.8 | 7.8 |

If desired, the compositions of this invention may be rendered more nearly neutral than the normal pH of between 7.0 and 8.0 by adding a quantity of a suitable mineral acid or acid salt to a water slurry of the product to increase the acidity toward the neutrality point of 7.0. For example, a composition of this invention having an analysis of 54.6% copper, 6.4% chloride, 2.3% sulfur, 0.8% ammonia and having a pH of 7.9 in aqueous admixture was acidified with hydrochloric acid to form the product having the following analysis: 54.3% copper, 8.2% chloride, 1.9% sulfur, 0.2% ammonia and a pH of 6.8. A second portion of the same initial product was acidified with sulfuric acid to produce a final product having the analysis: 55.2% copper, 6.5% chloride, 3.0% sulfur, 0.1% ammonia and a pH of 6.9.

What is claimed is:

1. A finely divided basic copper oxychloride sulfate material containing about 0.6% to about 1.1% ammonia, about 1.9% to about 12.6% chloride and about 1.0% to about 5.0% sulfur as sulfate, the balance being substantially a mixture of copper oxide and copper hydroxide.

2. Basic copper oxychloride sulfate modified to consist essentially of about 0.6%–1.1% ammonia, about 1.9% to about 12.6% chloride, about 1% to about 5% sulfur as sulfate, balance copper hydroxide and copper oxide, said basic copper oxychloride sulfate being in the form of extremely finely divided particles having sizes in the range of about 0.1 to about 15 microns in diameter with the preponderating mass of said particles having a size less than about 1 micron in diameter.

3. Basic copper oxychloride sulfate modified to consist essentially of about 0.6%–1.1% ammonia, about 1.9%–9.5% chloride, about 1.0% to about 3.5% sulfur as sulfate, balance copper hydroxide and copper oxide, said basic copper oxychloride sulfate being in the form of extremely finely divided particles having sizes in the range of about 0.1 to about 15 microns in diameter with the preponderating mass of said particles having a size less than about 1 micron in diameter.

4. The process for forming copper compositions which comprises the steps of contacting copper with an aqueous ammonium hydroxide solution containing ammonium sulfate in a minimum concentration of about 15 g./l., ammonium chloride in a minimum concentration of about 4 g./l., the ratio of ammonium chloride to ammonium sulfate being in the range of about 0.1 to about 1.6, maintaining said solution at a temperature in the range of room temperature to about 120° F. for a time sufficient to saturate said solution with cupric ion and form on the surface of said copper a film of finely divided basic copper oxychloride sulfate, agitating said solution in contact with said copper sufficiently to dislodge the said film of basic copper oxychloride sulfate from said copper particles and thereafter separating said particles from said reacting solution.

5. The process of forming copper compositions which comprises the steps of contacting copper with an aqueous ammoniacal solution containing about 20 to about 100 g./l. of amomnium hydroxide, a minimum of 15 g./l. of ammonium sulfate, a minimum of 4 g./l. of ammonium chloride, the ammonium hydroxide concentration being less than twice the sum of the concentrations of the said ammonium chloride and ammonium sulfate, maintaining said solution at a temperature in the range of about 80° F. to 120° F. and in contact with said copper for a time sufficient to saturate said solution with cupric ion and to form on the surface of said copper a film of finely divided basic copper oxychloride sulfate, agitating said solution in contact with said copper sufficiently to dislodge the said finely divided film from the surface of said copper, and thereafter separating said particles from said reacting solution.

6. The process in accordance with claim 5 wherein the ratio of ammonium chloride to ammonium sulfate is in the range of about 0.1 to 1.6.

7. The process in accordance with claim 5 wherein the said temperature is maintained within the range of about 90° F.–110° F.

8. The process in accordance with claim 5 wherein the ratio of ammonium chloride to ammonium sulfate is approximately 1 to 1.

9. The process in accordance with claim 4 wherein the concentration of said ammonium chloride varies inversely with the temperature with reference points as follows: 70° F.–80° F.—minimum of 20 g./l. of ammonium chloride, 80° F.–90° F.—minimum of 8 g./l. of ammonium chloride, above 90° F.—minimum 4 g./l. of ammonium chloride.

References Cited in the file of this patent

UNITED STATES PATENTS

| | | |
|---|---|---|
| 2,536,096 | Rowe | Jan. 2, 1951 |
| 2,536,097 | Rowe | Jan. 2, 1951 |

OTHER REFERENCES de Ong: Chemistry and Uses of Pesticides, 2nd ed., 1956, Reinhold Publ. Corp., page 42.